United States Patent [19]

Nunnemacher et al.

[11] 4,312,264
[45] Jan. 26, 1982

[54] FLUID PRESSURE OPERATED CYLINDER ASSEMBLY

[75] Inventors: Hermann A. Nunnemacher, Nashotah; Peter Weil, Jr., Greenfield, both of Wis.

[73] Assignee: Galland Henning Nopak Inc., Milwaukee, Wis.

[21] Appl. No.: 914,040

[22] Filed: Jun. 9, 1978

[51] Int. Cl.² .................. F16J 15/18; F16J 11/02
[52] U.S. Cl. ................................ 92/161; 92/168; 92/171
[58] Field of Search ............ 92/177, 168, 161, 171, 92/165 R

[56] References Cited

U.S. PATENT DOCUMENTS

| | | | |
|---|---|---|---|
| 2,042,078 | 5/1936 | Suhm et al. | 92/168 |
| 2,798,778 | 7/1957 | Flick | 92/168 |
| 3,005,669 | 10/1961 | Nunnemacher | 92/168 |
| 3,543,643 | 12/1970 | Southwell | 92/168 |
| 3,605,553 | 5/1969 | Panigati | 91/26 |
| 4,085,661 | 4/1978 | Schriever | 92/168 |
| 4,089,253 | 5/1978 | Visser | 92/168 |

Primary Examiner—Paul E. Maslousky
Attorney, Agent, or Firm—Michael, Best & Friedrich

[57] ABSTRACT

Disclosed herein is a fluid pressure operated cylinder assembly made up of an elongated barrel of a square shape in cross-section, and having a cylindrical bore extending therethrough defining longitudinally extending corners at spaced points around the bore. The elongated barrel has end faces at the opposite ends extending transversely with respect to the longitudinally extending corners and defining cylinder end planes bounding the opposite ends of the cylindrical bore. A cylinder head made of plastic and including an annular mounting ring molded therein is positioned entirely within the cylindrical bore adjacent one of the cylinder end planes. An end plate is secured in facial abutment with an end face and adjacent to the cylinder head by screws extending through the end plate and into the barrel corner. An annular thrust ring is held in fixed engagement with and between the mounting ring and the end plate by screws extending through the end plate and into the mounting ring, thereby longitudinally fixing the cylinder head in position within the cylindrical bore.

6 Claims, 4 Drawing Figures

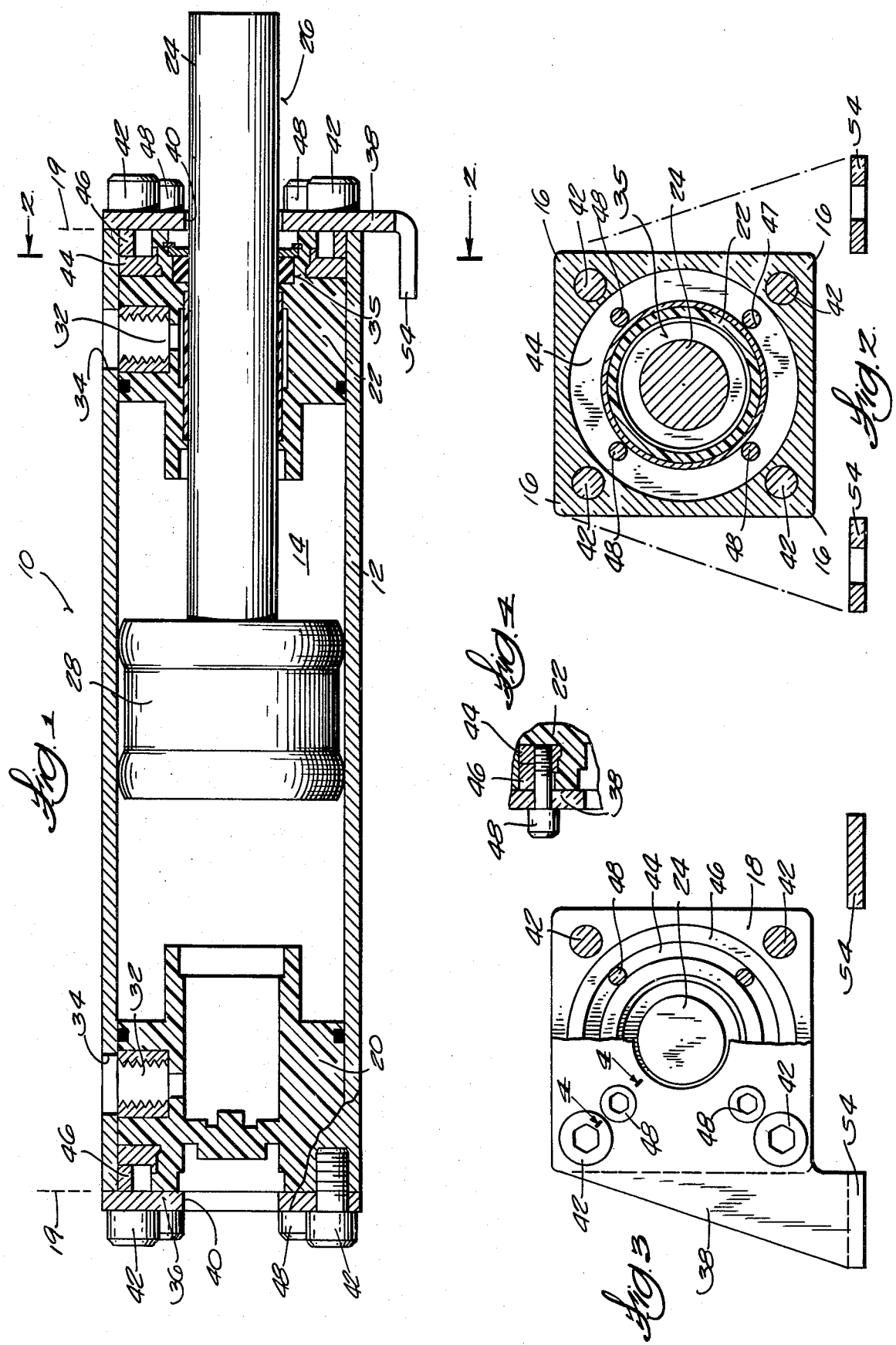

FLUID PRESSURE OPERATED CYLINDER ASSEMBLY

BACKGROUND OF THE INVENTION

The invention relates to pressure fluid operated cylinders, and more particularly, relates to arrangements utilized for securing a cylinder head in a fixed position with respect to the cylinder bore.

In the United States, a widely used cylinder assembly is made up of a circular barrel having discrete heads secured at the opposite ends thereof. The heads have a square cross-section, and are secured together, with the cylindrical barrel held therebetween, by tie rods which extend through the corners of the square heads and therebetween.

These square head tie rod cylinders are suitable for either pneumatic or hydraulic use and are manufactured to meet National Fluid Power Association (N.F.P.A.) standard dimensions. For a given power stroke, the standard dimensions are measured, for example, from the end of one head to the end of the other head, or measured from the end of one head to the end of the piston rod. Since the square head tie rod cylinders are manufactured in accordance with N.F.P.A. standards, they can be interchangeably mounted in various applications, and thus, have achieved substantially more widespread customer acceptance than cylinders which cannot meet all the N.F.P.A. standards. Although these cylinders have achieved wide spread use, they are relatively expensive to manufacture and assemble, and have limited flexibility with respect to mounting.

Another example of a fluid pressure operated cylinder having a different arrangement for securing the heads is disclosed in Panigati, U.S. Pat. No. 3,605,553, issued Sept. 20, 1971. Panigati discloses a circular cylinder having end members or heads fixed within the ends of a circular cylinder by means of resilient snap rings which have peripheral projections which are inserted in slots cut into the cylinder wall. Circular cap members, which abut against the ends of the cylinder, are secured to the heads to prevent inward longitudinal movement of the heads. The snap rings are the only members which prevent outward longitudinal movement of the heads, since the cap members are not directly secured to the cylinders. The specific details of the snap ring arrangement are disclosed in an earlier U.S. Panigati Pat. No. 3,421,786.

A typical example of a commercially available cylinder which embodies features of the above referenced Panigati patents is manufactured by WAIRCOM, located in Milano, Italy. The cylinder heads used by WAIRCOM are made of plastic, such as an acetalic resin, and each has a steel annular mounting ring molded therein and which faces an end of the cylinder, which cylinder is also made of steel. This mounting ring abuts against the previously mentioned snap ring to prevent outward longitudinal movement of the head, while the end cap, which is secured to the head by screws extending into the mounting ring, prevents inward movement of the head. A typical example of such a cylinder, is a WAIRCOM Series E cylinder, Model No. AKNBGB97/2. Although the plastic heads and the piston arrangement of the WAIRCOM cylinder are believed to be superior in cost and performance over the corresponding components in the square head tie rod cylinders previously discussed, the WAIRCOM cylinders do not meet all the N.F.P.A. standards, and thus, have achieved only limited use in the U.S.

More particularly, in the current WAIRCOM arrangement, the outer face of each WAIRCOM head is spaced from the end cap or end of the cylinder, about 3/16 of an inch. This is an exemplary reason for the WAIRCOM cylinders not meeting N.F.P.A. standards, e.g., the dimension of the cylinder from end to piston end, is too long. In addition to not meeting N.F.P.A. standards, WAIRCOM cylinders also have significant mounting limitations, because they present only a thin cylindrical barrel, which is difficult to utilize for mounting. Also, it is believed the WAIRCOM snap ring and cylinder slot arrangement cannot be used with a material softer than steel, such as aluminum, because the aluminum forming the slots tends to flow or lose its shape when under stress during cylinder operation.

Still another example of a different cylinder assembly having a different arrangement for securing the heads is disclosed in Nunnemacher, U.S. Pat. No. 3,005,669, which patent is assigned to the assignee of this application. Nunnemacher discloses a cylinder assembly with an elongated barrel having a square cross-section and including a cylindrical bore extending therethrough to define four longitudinally extending corners spaced around the bore. The Nunnemacher arrangement includes discrete end members or heads which have a square shape. Unlike the square head tie rod cylinder previously discussed, however, the Nunnemacher heads are secured to the ends of the square barrel by screws which extend through the heads and into the corners of the barrel. Although the Nunnemacher square barrel provides substantial flexibility over the aforementioned cylindrical barrels with respect to mounting, when the heads are secured to the ends of the square barrel, the resulting cylinder assembly, for a given power stroke, is too long to be compatible with all the N.F.P.A. mounting dimension standards. Accordingly, the Nunnemacher square barrel cylinder has achieved only limited use as an original or replacement cylinder.

This invention is concerned with this general area, and has among its objects to provide a cylinder assembly which eliminates some or all of the above noted and other disadvantages of prior art cylinders.

More particularly, the invention has among its objects to provide a cylinder assembly including a square barrel and a unique arrangement utilized to secure the heads within the bore of the barrel so that the cylinder assembly is flexible with respect to mounting, and yet meets N.F.P.A. standards.

The invention also has among its objects to provide such a cylinder assembly which is economical to manufacture and assemble, and which is particularly suited for pneumatic pressure use.

SUMMARY OF THE INVENTION

In order to achieve the foregoing and other objects, the invention provides a cylinder assembly including an elongated barrel of a square shape in cross-section and having a cylindrical bore extending longitudinally therethrough for defining longitudinally extending corners at spaced points around the bore. The elongated barrel has end faces at the opposite ends thereof extending transversely with respect to the longitudinally extending corners and defining cylinder end planes bounding the opposite ends of the cylindrical bore. The assembly includes a cylinder head positioned entirely within the cylindrical bore and extending adjacent one of the cylinder end planes. An end plate is secured in facial abutment with one of the barrel end faces by means, exterior of the cylindrical bore, and means are provided for securing the cylinder head to the end plate to longitudinally fix the head in position within the cylindrical bore.

In a preferred embodiment, the means securing the end plates comprises screws extending entirely through the end plate and longitudinally into the corners of the barrel. The end plate preferably includes means for defining a mounting bracket, such as flanges extending longitudinally inward with respect to the ends of the cylinder.

Also in a preferred embodiment, the cylinder head is composed of plastic and includes an annular mounting ring molded therein, and spaced from and facing the cylinder end plate. The means for securing the head to the end plate comprises an annular thrust ring having an inner diameter greater than the inner diameter of the mounting ring and which extends between the mounting ring and end plate. The securing means also comprises screws extending entirely through the end plate and into the mounting ring for drawing the mounting ring into fixed engagement with the thrust ring, which, in turn, is drawn into fixed engagement with the end plate. The thrust ring prevents separation of the mounting ring from its molded-in position when the screws extending into the mounting ring are tightened.

Other features and advantages of the embodiments of the invention will become known by reference to the following general description, the appended claims and drawing.

BRIEF DESCRIPTION OF THE DRAWING

FIG. 1 is a longitudinal axial section of a cylinder assembly embodying various features of the invention.

FIG. 2 is a section view taken along line 2—2 shown in FIG. 1.

FIG. 3 is a partially broken away end view of the end of the cylinder shown in section in FIG. 2.

FIG. 4 is a partial sectional view taken along lines 3—3 shown in FIG. 3.

GENERAL DESCRIPTION

Shown in the drawing is a pressure fluid operated cylinder assembly 10 including an elongated barrel 12 having a square shape in cross section, and a cylindrical bore 14 which extends longitudinally therethrough and defines four longitudinally extending corners 16 (See FIG. 2.) The barrel 12 includes at the opposite ends thereof, end faces 18 (See FIG. 3) which extend transversely with respect of the longitudinally extending corners 16 and which define cylinder end planes (denoted by lines 19 in FIG. 1) which bound the opposite ends of the cylindrical bore 14. The barrel 12 can be made of any suitable material having sufficient strength for its intended use. In the preferred construction the barrel 12 is made of aluminum for pneumatic pressure use.

The cylinder assembly includes a pair of cylinder heads 20 and 22 which are positioned entirely within the cylinder bore 14 so that each of the heads extends adjacent one of the cylinder end planes 19. The head 22 constitutes a support for slidably receiving the rod 24 of a piston 26, which includes a resilient sleeve 28 mounted on a disc (not shown) welded to the inner end of the piston rod 24. The heads 20 and 22 are conventionally provided with ports 32 which are aligned with appurtures 34 in the barrel 12, and which are provided for entry and escape of fluid. A conventional sealing arrangement, generally designated 35, is secured to the head 22 to prevent the fluid within the bore 14 from escaping along the piston rod 24 past the head 22.

The general cylinder operation and the construction of the piston 26 and its interaction with the heads 20 and 22 is conventional and does not make up a part of the present invention, and hence, will not be described in further detail. For details of the piston shown, see for example, Panigati U.S. Pat. No. 3,605,553 issued Sept. 20, 1971.

The cylinder assembly 10 includes square end plates 36 and 38 located in facial abutment with the end faces 18 of the square barrel 12, and which include a central opening 40 through which a piston rod may pass. Each end plate is secured by means, exterior of the cylindrical bore, to a barrel end face. Preferably such securing means comprises four screws 42 accessible from the outside of the cylinder and which extend through an end plate and into the corners 16.

In order to secure the heads 20 and 22 within the cylindrical bore 14, means are provided for securing the heads to the end plates. In the preferred construction illustrated, each of the cylinder heads is conventionally ported to allow pneumatic cushioning at the end of the piston stroke (one port 32 shown) and is composed of plastic, and includes a steel annular mounting ring 44 molded therein so that it is spaced from and faces an end plate. Such a cylinder head (e.g. 50 mm for a 16 mm piston rod) is commercially manufactured by WAIRCOM and identified as part number 1220001289300.

The means for securing the heads to the end plates preferably includes an annular thrust ring 46 located between the mounting ring and the end plate. The securing means also comprises screws 48 extending through the end plate and into threaded appertures 47 in the mounting ring. The thrust ring 46 has an inner diameter greater than the inner diameter of the mounting ring 44 so that the screws 48 clear the thrust ring 46 when they are threaded into appertures 47. The screws 48 are tightened for drawing the mounting ring 44 into fixed engagement with the thrust ring 46, and, in turn, for drawing the thrust ring 46 into fixed engagement against the end plate. The thrust ring 46 prevents the mounting ring 44 from being separated or pulled away from its molded in position in the head 22, when the screws 48 are tightened. Accordingly, the head fastening arrangement described fixes the head in position within the bore 14 in a more economical and positive fashion than the aforementioned Panigati/WAIRCOM connecting arrangement which requires a snap ring having projections extending into slots cut into the cylinder wall.

In the preferred construction illustrated, the end plate 38 includes means, such as flanges 54, for defining a mounting bracket. As best shown in FIG. 1, the flanges 54 extend inwardly toward the cylinder head so that the mounting bracket and cylinder are compatible with certain N.F.P.A. mounting dimension standards. Other means or flange arrangements associated with the end plates can be utilized to meet the other N.F.P.A. mounting standards.

It should now be readily appreciated that the invention disclosed herein can be embodied to provide a cylinder assembly including a square barrel which provides flexibility with respect to mounting, and also including a unique arrangement utilized to secure the heads within the bore of the barrel to provide a cylinder which is economical to manufacture and assemble, and yet, which meets N.F.P.A. standards.

It is also to be understood that the invention is not confined to the particular construction and arrangement of parts herein illustrated and described, but is intended to embrace all such modified forms thereof as come within the scope of the following claims.

We claim:

1. A fluid pressure operated cylinder assembly comprising:
   an elongated barrel of a square shape in cross-section having a cylindrical bore extending longitudinally therethrough and defining longitudinally extending corners at spaced points around said bore, said elongated barrel having end faces at the opposite ends thereof extending transversely with respect to said longitudinally extending corners and defining cylinder end planes bounding the opposite ends of said cylindrical bore,
   a cylinder head positioned entirely within said cylindrical bore, said head extending adjacent one of said cylinder end planes, said cylinder head being composed of plastic and including an annular mounting ring molded therein and spaced from and facing said one of said cylinder end planes,
   an end plate,
   first means, exterior of said cylindrical bore, for securing said end plate in facial abutment to one of said barrel end faces and adjacent said cylinder head, and
   second means for securing said cylinder head to said end plate to longitudinally fix said head in position within said cylindrical bore, said second securing means comprising an annular thrust ring having an inner diameter greater than the inner diameter of said mounting ring and extending between said annular ring and said end plate, and screws extending entirely through said end plate and into said mounting ring for drawing said mounting ring into fixed engagement with said thrust ring, and for drawing said thrust ring into fixed engagement with said end plate.

2. A cylinder assembly as specified in claim 1, wherein said first securing means comprises screws extending entirely through said end plate and longitudinally into said corners of said barrel.

3. A cylinder assembly as specified in claim 1, wherein said end plate includes means for defining a mounting bracket.

4. A pressure fluid operated cylinder assembly comprising:
   an elongated barrel of a square shape in cross-section having a cylindrical bore extending longitudinally therethrough and defining longitudinally extending corners at spaced points around said bore, said elongated barrel having end faces at the opposite ends thereof extending transversely with respect to said longitudinally extending corners and defining cylinder end planes bounding the opposite ends of said cylindrical bore,
   a cylinder head positioned entirely within said cylindrical bore and extending adjacent one of said cylinder end planes, said cylinder head being composed of plastic and including an annular mounting ring molded therein and spaced from and facing said one of said cylinder end planes,
   an end plate,
   screws, exterior of said cylindrical bore, extending through said end plate and into said corners for securing said end plate in facial abutment to one of said end faces and adjacent said cylinder head,
   an annular thrust ring having an inner diameter greater than the inner diameter of said mounting ring and extending between said mounting ring and said end plate, and
   screws extending through said end plate and into said mounting ring for drawing said mounting ring into fixed engagement with said thrust ring, and for drawing said thrust ring into fixed engagement with said end plate, thereby fixing said cylinder head in position within said cylindrical bore.

5. A cylinder assembly as specified in claim 4, wherein said end plate includes means for defining a mounting bracket.

6. A fluid pressure operated cylinder assembly comprising:
   an elongated barrel of a square shape in cross-section having a cylindrical bore extending longitudinally therethrough and defining longitudinally extending corners at spaced points around said bore, said elongated barrel having end faces at the opposite ends thereof extending transversely with respect to said longitudinally extending corners and defining cylinder end planes bounding the opposite ends of said cylindrical bore,
   a cylinder head positioned entirely within said cylindrical bore, said head extending adjacent one of said cylinder end planes, and including an annular mounting ring portion spaced from and facing one of said cylinder end planes,
   an end plate,
   first means, exterior of said cylindrical bore, for securing said end plate in facial abutment to one of said barrel end faces and adjacent said cylinder head, and
   second means for securing said cylinder head to said end plate to longitudinally fix said head in position within said cylindrical bore, said second securing means comprising an annular thrust ring extending between said annular ring and said end plate, and means extending entirely through said end plate and into said mounting ring portion for drawing said mounting ring portion into fixed engagement with said thrust ring, and for drawing said thrust ring into fixed engagement with said end plate.

* * * * *